United States Patent
Chen et al.

(10) Patent No.: US 9,091,833 B2
(45) Date of Patent: Jul. 28, 2015

(54) CASTELLATED OPTICAL FIBER CABLE RETENTION STRUCTURE

(71) Applicant: NANOPRECISION PRODUCTS, INC., El Segundo, CA (US)

(72) Inventors: Yang Chen, El Segundo, CA (US);
King-Fu Hii, El Segundo, CA (US);
Tewodros Mengesha, El Segundo, CA (US); Fred Bosch, El Segundo, CA (US); Chris Morgan, El Segundo, CA (US); Robert Ryan Vallance, El Segundo, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 0 days.

(21) Appl. No.: 13/668,207

(22) Filed: Nov. 2, 2012

(65) Prior Publication Data
US 2013/0121656 A1    May 16, 2013

Related U.S. Application Data

(60) Provisional application No. 61/554,938, filed on Nov. 2, 2011.

(51) Int. Cl.
G02B 6/00     (2006.01)
G02B 6/44     (2006.01)
G02B 6/38     (2006.01)

(52) U.S. Cl.
CPC ............ *G02B 6/4471* (2013.01); *G02B 6/3887* (2013.01); *G02B 6/387* (2013.01); *G02B 6/3862* (2013.01); *G02B 6/3865* (2013.01); *G02B 6/3885* (2013.01)

(58) Field of Classification Search
USPC .......................... 385/134, 135, 136, 137, 139
See application file for complete search history.

(56) References Cited

U.S. PATENT DOCUMENTS

| 4,755,018 A | 7/1988 | Heng et al. |
| 5,214,730 A | 5/1993 | Nagasawa et al. |

(Continued)

FOREIGN PATENT DOCUMENTS

| JP | 05-060945 | 3/1993 |
| JP | 2008-241729 | 10/2008 |

OTHER PUBLICATIONS

International Search Report of Counterpart PCT International Application No. PCT/US2012/063459.

(Continued)

*Primary Examiner* — Jennifer Doan
(74) *Attorney, Agent, or Firm* — Liu & Liu

(57) ABSTRACT

A cable retention structure defining a castellated fiber cable clamping surface. The castellated surface has a series of alternating small and large cavities distributed along the axial direction. The small cavities are sized such that when the castellated surface is pressed against the buffer jacket exterior of the fiber cable, the small cavities will be able to clamp the fiber cable jacket within its full dimensional tolerance range. The large cavities are sized to provide sufficient clearance to accommodate the relatively soft material of the cable jacket which cannot be accommodated by the small cavities. The cable jacket is securely held by the retention structure to prevent slipping. Accordingly, fiber cables having buffer jackets with large dimensional variations can still be securely retained by the castellated retention structure in accordance with the present invention.

20 Claims, 14 Drawing Sheets

(56) References Cited

U.S. PATENT DOCUMENTS

| | | |
|---|---|---|
| 5,242,315 A | 9/1993 | O'Dea |
| 6,206,579 B1 * | 3/2001 | Selfridge et al. ............... 385/60 |
| 7,228,038 B2 * | 6/2007 | Kamada ....................... 385/123 |
| 7,311,449 B2 | 12/2007 | Barnoski et al. |
| 2002/0114585 A1 | 8/2002 | Nishita |

OTHER PUBLICATIONS

Customer Drawing No. C13468, published by US Conec, dated Nov. 30, 2010.

* cited by examiner

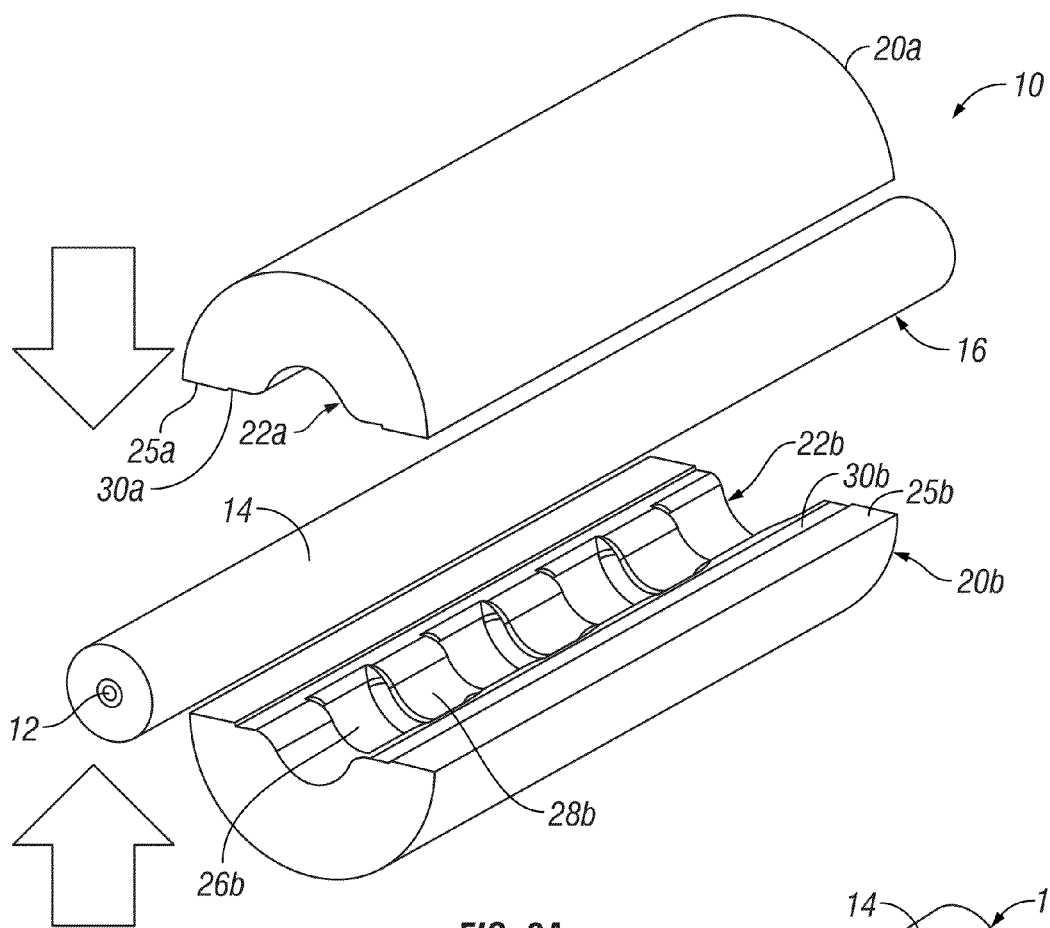
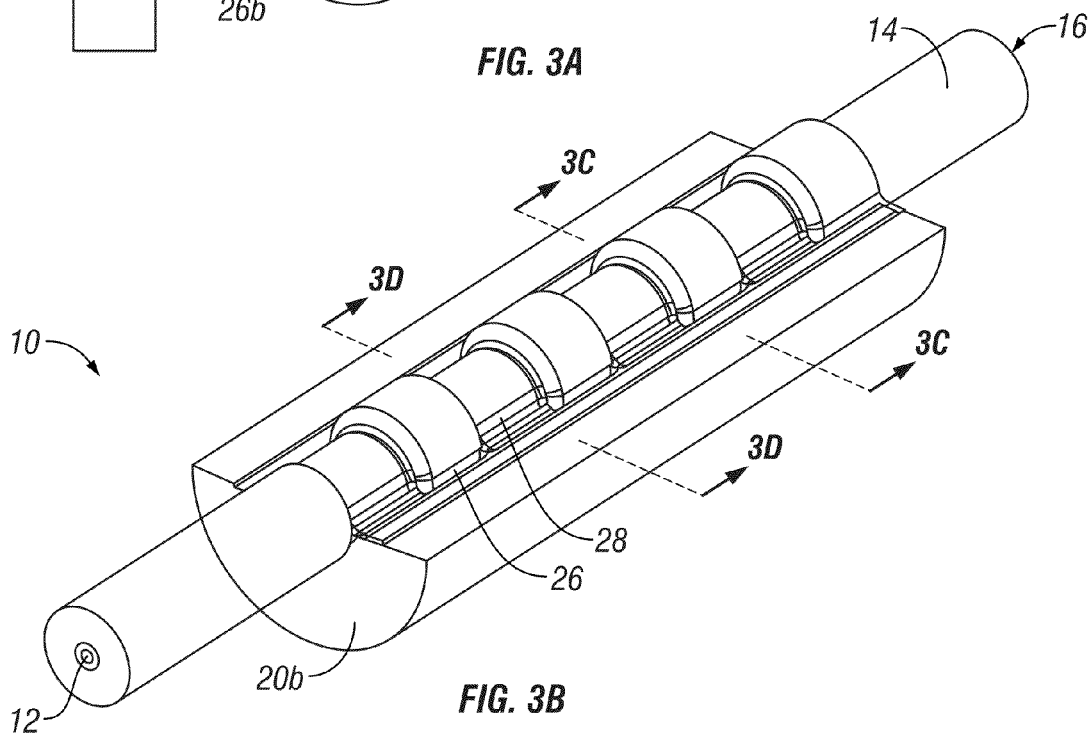
FIG. 3A
FIG. 3B

CASTELLATED OPTICAL FIBER CABLE RETENTION STRUCTURE

PRIORITY CLAIM

This application claims the priority of U.S. Provisional Patent Application No. 61/554,938 filed on Nov. 2, 2011, which is fully incorporated by reference as if fully set forth herein. All publications noted below are fully incorporated by reference as if fully set forth herein.

BACKGROUND OF THE INVENTION

1. Field of the Invention

The present invention relates to optical fiber connectors, in particular optical fiber cable retention structures in optical fiber connectors.

2. Description of Related Art

There are many advantages of transmitting light signal via optical fiber waveguides, and the use thereof is diverse. Single or multiple fiber waveguides may be used simply for transmitting visible light to a remote location. Complex telephony and data communication systems may transmit multiple specific optical signals. These devices couple fibers in an end-to-end relationship, with the coupling being one source of light loss. Precision alignment of two polished ends of fibers is needed to ensure that overall optical loss in a fiber link is equal or less than the specified optical connector loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection than splicing. The connectors mechanically couple and align the cores of fibers so that light can pass end-to-end. Better connectors lose very little light due to reflection or misalignment of the fibers. Connectors, in both parallel/multiple fiber and single fiber links, operating at multi-gigabit rates must be assembled with subcomponents fabricated with sub micron precision. As if producing parts with such precision levels were not challenging enough, for the resulting end product to be economical, it must be done in a fully automated, very high-speed process.

Current optical fiber connectors have not changed in basic design for many years. The basic connector unit is a connector assembly. FIG. 1 illustrates an example of an optical fiber connector 1400 for a cable 1410 containing optical fibers 1412, which is commercialized by US Conec Ltd. The connector includes an assembly of components consisting of a ferrule 1402, a ferrule housing 1404, a cable boot 1406, alignment guide pins 1408, and other hardware provided within or outside the housing (e.g., cable strain relief, crimp, biasing spring, spacer, etc.). The ferrule 1402 and the terminating end faces of the fibers 1412 are polished. The ferrule 1402 in the optical fiber connector 1400 is spring-loaded to provide an axial bias to press together the polished end faces of the fibers in two connectors in an end-to-end configuration. In most cases, the intent is to establish physical contact between coupled fibers to prevent loss of light. Physical contact avoids a trapped layer of air between two fibers, which increases connector insertion loss and reflection loss. An adaptor, not shown, is required to securely couple the ferrules of two connectors (the ferrule housing 1404 of each connector is plugged into the adaptor).

The optical fiber connector illustrated in FIG. 1 manufactured by US Conec Ltd. is purportedly in accordance with the structure disclosed in U.S. Pat. No. 5,214,730, which is assigned to Nippon Telegraph and Telephone Corporation. As illustrated in the '730 patent, the optical fiber connector receives a optical fiber ribbon cable having a plurality of individual optical fibers and maintains the individual optical fibers in a predetermined relationship. The optical fiber connector can be mated with another optical fiber connector (e.g., using an adaptor) so as to align the plurality of individual optical fibers of one optical fiber connector with the plurality of optical fibers of the other optical fiber connector.

The ferrule 1402 from US Conec Ltd. is generally in the form of a plastic block having a series of over-sized through-holes that provide sufficient clearance for inserting the terminating ends of optical fibers 1412 and alignment pins 1408 into the block. The ferrule 1402 is formed by molding of a plastic polymer that is often reinforced by glass particles. To insert the terminating ends of the multiple optical fibers 1412 through the holes in the ferrule block 1402, the protective buffer jacket (resin) layers of the optic fibers are stripped off to expose the cladding layer near the terminating ends, and the cladding layer is coated with a layer of epoxy. The terminating ends of the optical fibers are then threaded into the over-sized holes in the ferrule. The ends of the optical fibers 1412 are securely held in the ferrule 1402 upon curing of the epoxy. Similarly, the alignment pins 1408 are retained with epoxy after inserting into the oversized holes in the ferrule 1402 provided for the pins.

The above described ferrule has several significant drawbacks. The injection molded structure inherently does not hold tolerance well. The polymer is not rigid and deforms when loads (forces or moments) are applied to the fiber cable or connector housing. Polymers are also susceptible to creep and thermal expansion/contraction over longer periods of time. The clearance in the over-sized holes in the ferrule further affects tolerance of end-to-end alignment of fibers. The epoxy shrinks upon curing, which leads to bending of the plastic ferrule. Further, epoxy creeps over time, leading to pistoning or retracting of the optical fiber ends (which are pushed against the ends of adjoining fibers) within the holes in the ferrule under the applied axial bias of the spring-load in the connector. This compromises the integrity of the surface contact interface of opposing fiber end faces. These and other deficiencies result in poor resultant tolerance that is more to be desired for modern day optical fiber applications.

Currently, it is generally accepted that fiber connectors cost too much to manufacture and the reliability and loss characteristics are more to be desired. The tolerance of the fiber connectors must improve, and the cost of producing fiber connectors must decrease if fiber optics is to be the communication media of choice for short haul and very short reach applications. The relatively widespread and ever increasing utilization of optical fibers in communication systems, data processing and other signal transmission systems have created a demand for satisfactory and efficient means of inter joining fiber terminals.

To address those needs, the Assignee of the present invention developed a series of optical fiber connector designs, which overcome many of the drawbacks of the prior art. Some of these designs are directed to various improvements to ferrule designs (e.g., ferrules with open grooves and ferrules having alignment structures with open grooves), which can be more cost effectively manufactured and result in optical fiber connectors that are more reliable compared to the prior art optical fiber connectors noted above.

To further push the envelope in optical fiber connector designs, it is further desirable to improve on other aspects of optical fiber connectors beyond ferrules designs. One aspect that can be improved is the retention structure for the fiber cable to prevent breakage of the fiber and retraction of the optical fiber from the ferrule. In U.S. Pat. No. 7,311,449, FIGS. 38 and 39 refers to a crimping member attached to a fiber ferrule. A fiber strength member extends from the crimping member, which supports the fiber cable and maintains the longitudinal position of the fiber relative to the ferrule. The fiber strength member provides strain relief for the fiber cable. It is noted that given the soft materials of the buffer jacket of an optical fiber cable, the overall outer diameter (O.D.) of the fiber cable does not have a tight dimensional tolerance. For example, according to a particular specification for tight buffer optical fiber cables published by Corning Cable Systems in April 2012, the external diameter of the thermoplastic buffer coating shall be 900±50 µm. Heretofore, retention structures for the fiber cable have not been designed to effectively accommodate the relatively large ±50 µm variation of the buffer jacket.

What is needed is an improved optical fiber connector having an improved fiber cable retention structure, which accommodates large variations in overall fiber cable external diameter, and further improves manufacturing, ease of use and reliability at reduced costs.

SUMMARY OF THE INVENTION

The present invention provides a fiber cable retention structure (e.g., in an optical fiber connector), which overcomes many of the drawbacks of the prior art fiber cable retention structures. The fiber cable retention structure in accordance with the present invention is designed to accommodate large variations in the relatively soft exterior layer(s) of an optical fiber cable, which provides ease of use and high reliability with low environmental sensitivity, and which can be fabricated at low cost.

In accordance with the present invention, the cable retention structure comprises at least a body defining a fiber cable clamping surface having castellations distributed along a direction parallel to the axis of the fiber cable. The castellated surface resembles a corrugated surface, and when provided at the inside wall of a groove, defines a series of alternating small and large cavities distributed along the axial direction. The small cavities are sized such that when the castellated surface is pressed against the buffer jacket exterior of the fiber cable, the small cavities will be able to clamp the fiber cable jacket within its full dimensional tolerance range. The large cavities are sized to provide sufficient clearance to accommodate the relatively soft material of the cable jacket which cannot be accommodated by the small cavities. The cable jacket is thus securely held by the retention structure to prevent slipping. Accordingly, fiber cables having buffer jackets with large dimensional variations can still be securely retained by the castellated retention structure in accordance with the present invention.

In one embodiment, the fiber cable retention structure comprises a first plate (e.g., a cylindrical body having a semicircular sectional shape) having an open groove with a castellated wall along the axial direction. The groove wall alternates between large and small widths along the axial direction, thereby defining alternating large and small cavities along the axial direction. The castellated groove receives the fiber cable. A second plate (e.g., a cylindrical body having a semicircular sectional shape) having an open groove is provided to complement the first plate, to form a clamping structure for the fiber cable. The groove of the second plate is defined with similar castellations distributed in the axial direction, or may be flat in the axial direction (i.e., without castellation). In use, the first and second plates clamp on the fiber cable jacket, with the fiber cable securely retained in the alternating large and small cavities defined by the first and second plates. The fiber cable jacket has a resultant crimped structure, as "molded" by the castellated grooves of the first and second plates.

In one embodiment of the present invention, the cable retention structure is integral to the ferrule that holds the bare fiber end section. In this embodiment, the castellated structure extends from an end of the ferrule. In another embodiment, the cable retention structure may be a structure separate from the ferrule that holds the bare fiber end section. The cable retention structure may be attached to the ferrule, or the retention structure may comprise a castellated insert supported and biased against the fiber cable by an external structure, such as the cable connector housing and/or an extension of the ferrule.

In another aspect of the present invention, the open structure of the cable retention structure lends itself to mass production processes such as stamping and extrusion, which are low cost, high throughput processes.

In one embodiment, the retention structure is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Alternatively, the retention structure may be made of a plastic or polymeric material.

The cable retention structure in accordance with the present invention overcomes many of the deficiencies of the prior art, resulting in an optical fiber connector that accommodates large variations in the relatively soft external layer(s) of an optical fiber cable, which provides ease of use and high reliability with low environmental sensitivity, and which can be fabricated at low cost.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 2 illustrates a clamping plate of an optical fiber cable retention structure in accordance with one embodiment of the present invention, wherein

FIG. 3 illustrates an optical fiber cable retention structure comprising two clamping plates of FIG. 2; wherein FIG. 3A is an exploded perspective view, FIG. 3B is a partial perspective view with one of the clamping plates omitted.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a fiber cable retention structure (e.g., in an optical fiber connector), which overcomes many of the drawbacks of the prior art fiber cable retention structures. The fiber cable retention structure in accordance with the present invention is designed to accommodate large variations in the relatively soft exterior layer(s) of an optical fiber cable, which provides ease of use and high reliability with low environmental sensitivity, and which can be fabricated at low cost. The fiber cable retention structure comprises at least a body defining a fiber cable clamping surface having castellation distributed along a direction parallel to the axis of the fiber cable. The castellated surface comprises a series of alternating small and large cavities distributed along the axial direction.

While the invention is described below in connection with cable retention structures deployed in optical fiber connectors, the inventive cable retention structure may be adapted and deployed in other components involving optical fibers, such as a structure for splicing optical fibers, without departing from the scope and spirit of the present invention.

Figure 2A:
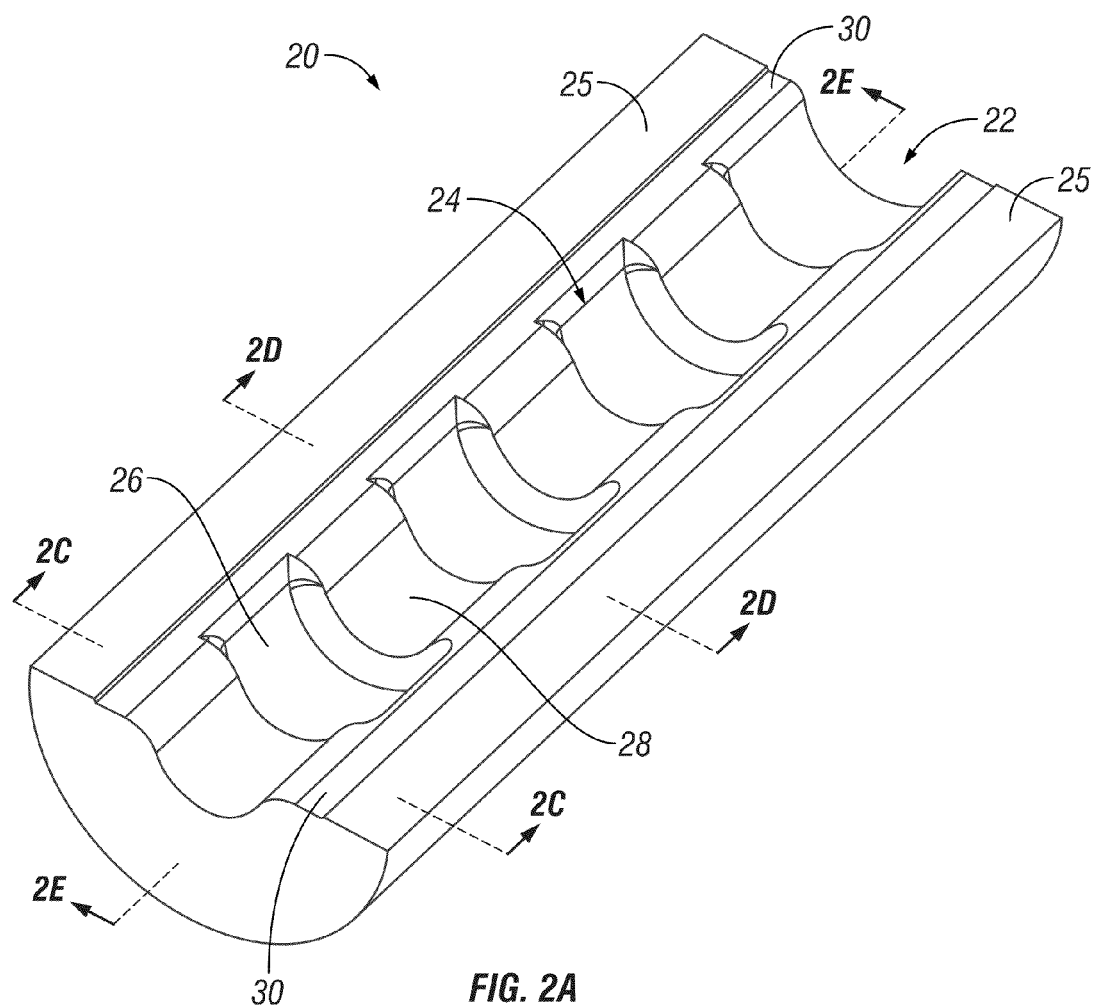
FIG. 2A is a perspective view.
Figure 2B:
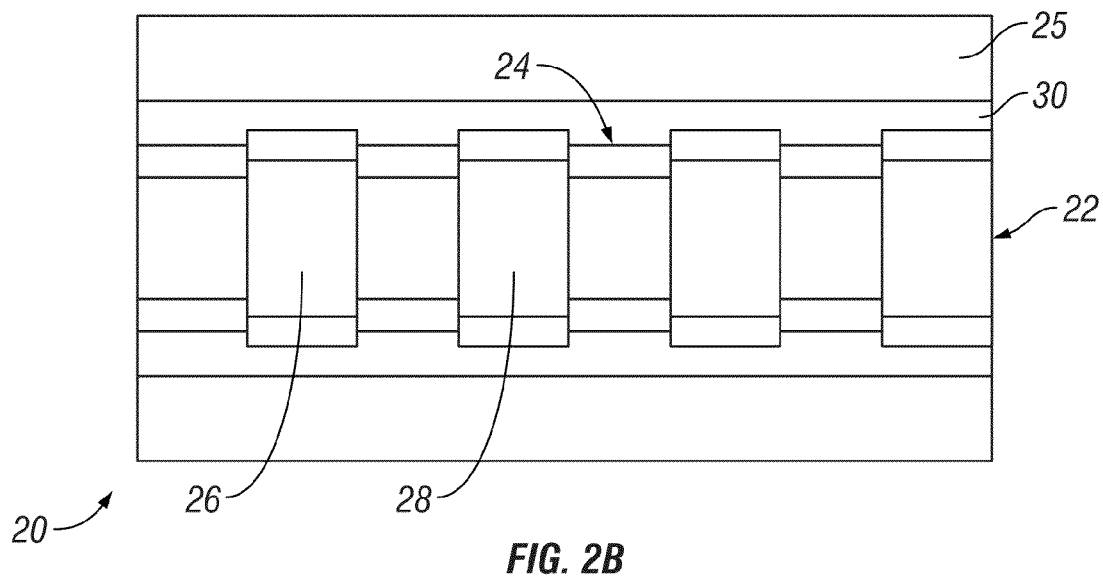
FIG. 2B is a top view.
Figure 2C:
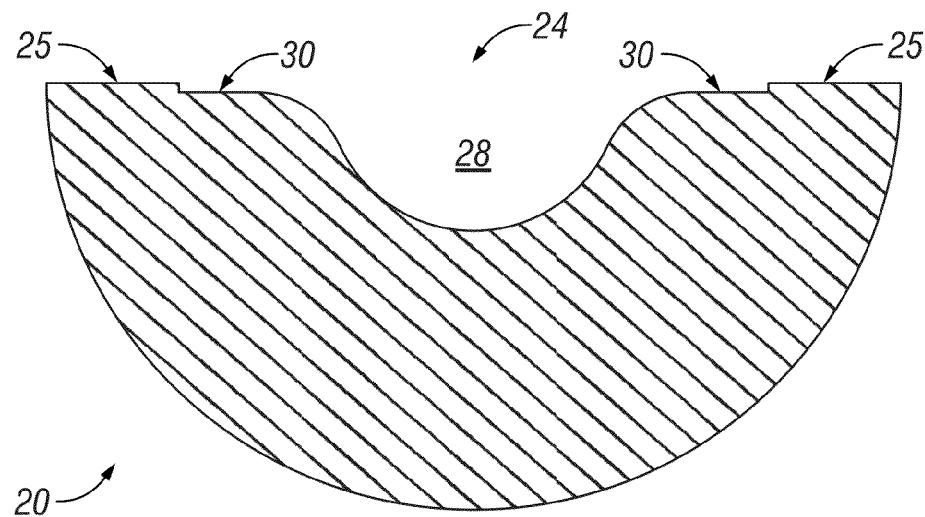
FIG. 2C is a sectional view taken along line 2C-2C in FIG. 2A.
Figure 2D:
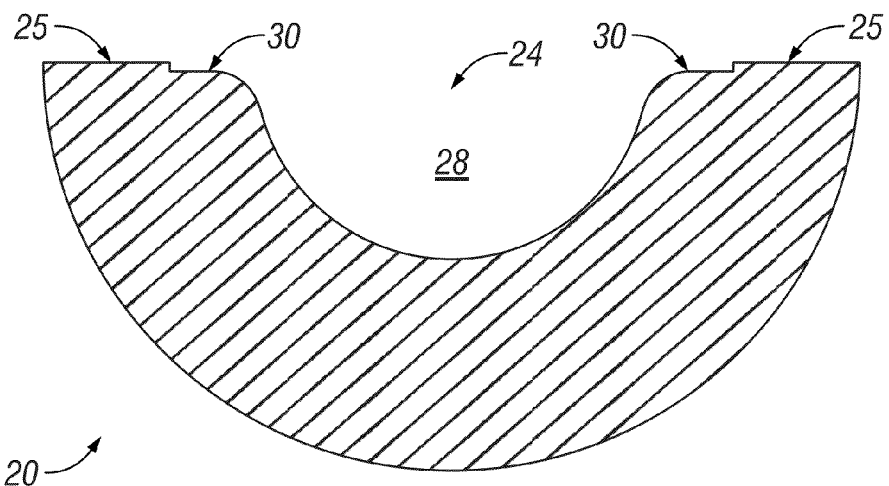
FIG. 2D is a sectional view taken along line 2D-2D in FIG. 2A.
Figure 2E:
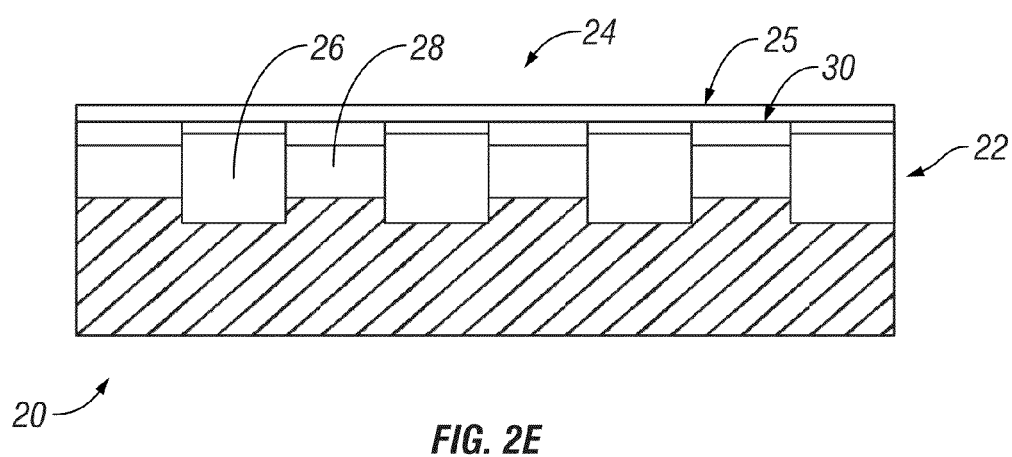
FIG. 2E is a sectional view taken along line 2E-2E in FIG. 2A.

FIGS. 2A to 2E illustrate a body in the form of a clamping plate 20 that provides an optical fiber cable retention structure in accordance with one embodiment of the present invention. The plate 20 has a cylindrical body having an open groove 22 defined at a top surface. In this illustrated embodiment, the plate 20 has an overall semicircular sectional shape (see also FIGS. 2C and 2D). Other overall sectional shapes (e.g., rectangular, square, hexagon, etc.) may be adopted without departing from the scope and spirit of the present invention. The groove 22 is defined by a castellated wall 24 along its longitudinal or axial direction. The groove 22 has a generally semicircular sectional shape. The groove 22 alternates between large and small diameter along the axial direction, thereby defining alternating large cavities 26 and small cavities 28 along the axial direction. Referring to FIGS. 2C and 2D, the top surface 25 of the plate 20 is slightly offset to provide a relief 30 along both edges of the groove 22.

Figure 3C:
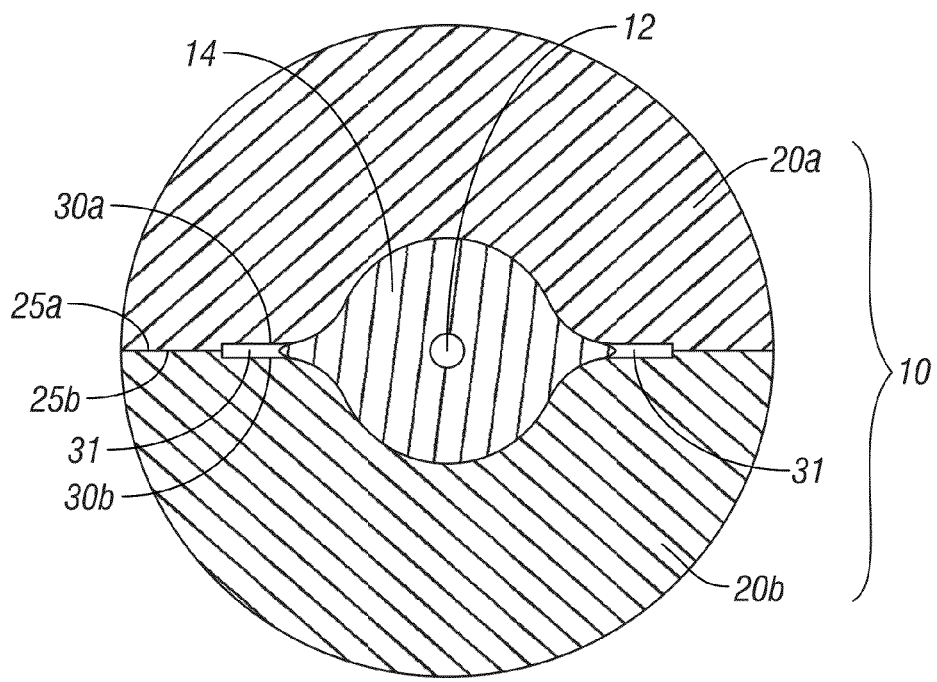
FIG. 3C is a sectional view taken along line 3C-3C in FIG. 3B.

FIGS. 3A to 3D illustrate an optical fiber holder 10 that comprises two opposing clamping plates (20a, 20b) each having a body including the cable retention structure illustrated in FIG. 2. (In this embodiment, the reference numbers bearing "a" and "b" designate the corresponding parts for the respective clamping plates 20a and 20b.) Each plate (20a, 20b) corresponds to a halve of an overall clamping structure for the fiber cable 16. The fiber cable 16 comprises an optical fiber 12 protected with an exterior cable jacket 14 (e.g., a buffer coating made of a polymeric material such as a thermoplastic). The cable jacket 14 is received in the grooves (22a, 22b) between the plates (20a, 20b). As the opposing plates (20a, 20b) are pressed towards each other to mate at the flat surfaces (25a, 25b), the fiber cable 16 is sandwiched as shown in FIG. 3A. The plates (20a, 20b) together surround the exterior of the fiber cable 16. The grooves (22a, 22b) clamp on the cable jacket 14, with the fiber jacket 14 securely retained by castellation defined by the alternating large cavities (26a, 26b) and small cavities (28a, 28b).

Figure 3D:
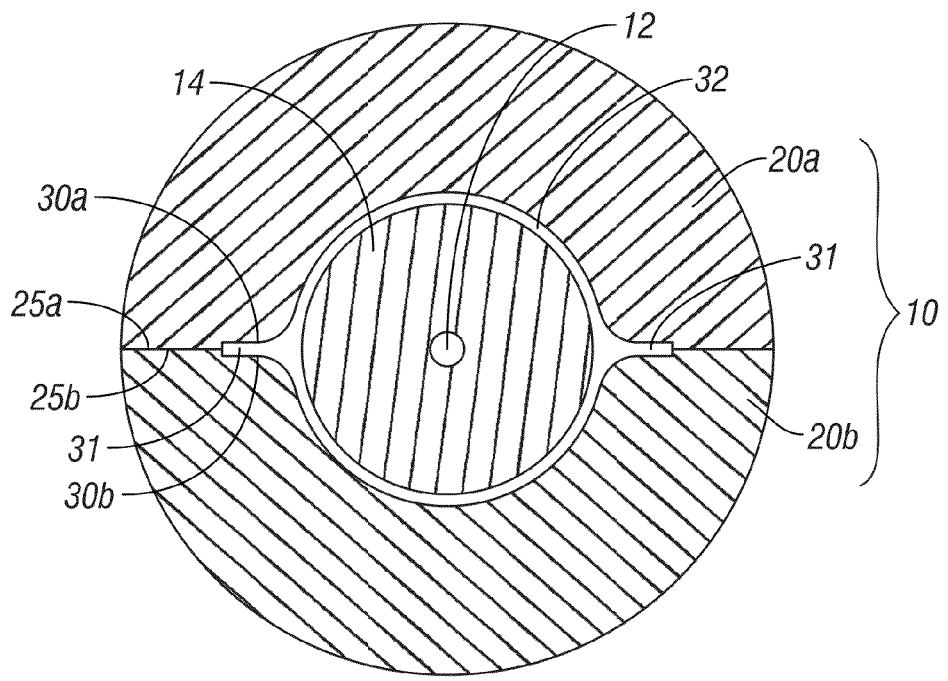
FIG. 3D is a sectional view taken along line 3D-3D in FIG. 3B.

Refer also to FIGS. 3C and 3D, when the plates (20a, 20b) are pressed together, the reliefs (30a, 30b) define a small pocket 31 extending from either side of the grooves (22a, 22b) towards the mated surfaces (25a, 25b). As shown in FIG. 3C, the walls of the small cavities (28a, 28b) press on the buffer material of the cable jacket 14 and cause excess buffer material that cannot be accommodated in the small cavities (28a, 28b) to flow into the large cavities (26a, 26b) and the pocket 31 defined between the reliefs (30a, 30b). The small cavities (28a, 28b) are sized such that when the plates (20a, 20b) are pressed together, the small cavities (28a, 28b) will be able to firmly clamp against the exterior surface of the cable jacket 14 within its full dimensional tolerance range. On the other hand, referring to FIG. 3D, the large cavities (26a, 26b) are sized to provide sufficient annular space 32 around the grooves (22a, 22b) to accommodate the excess buffer material of the cable jacket 14 which cannot be accommodated by the small cavities (28a, 28b) and the pockets 31 defined between the reliefs (30a, 30b), within the entire range of dimensional tolerance of the cable jacket 14. For example, for a retention structure designed for use with a fiber cable 16 having a cable jacket 14 with a specification of 900±50 μm O.D., the large cavities (26a, 265b) and the small cavities (28a, 28b) are sized to allow the plates (20a, 20b) to firmly clamp on fiber cables having an actual O.D. between 850 μm and 950 μm, with the surfaces (25a, 25b) of the plates (20a, 20b) remaining in a mating relationship.

Figure 4A:
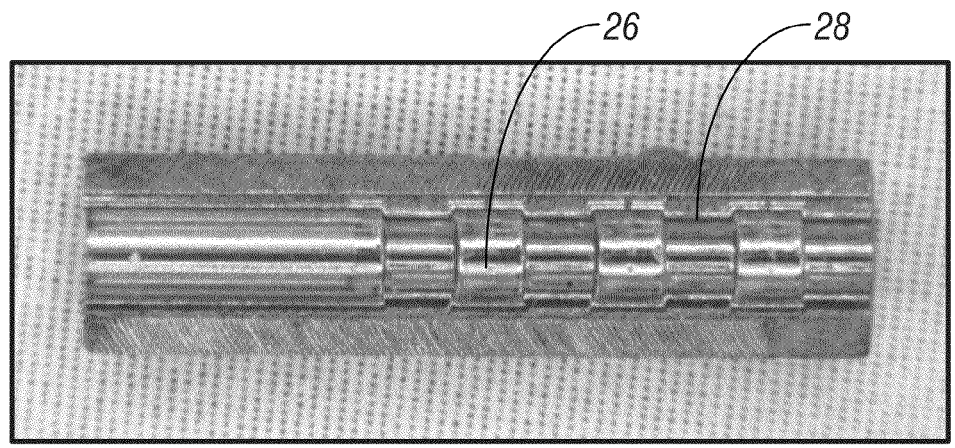
FIG. 4A is a photographic image of a clamping plate.
Figure 4B:
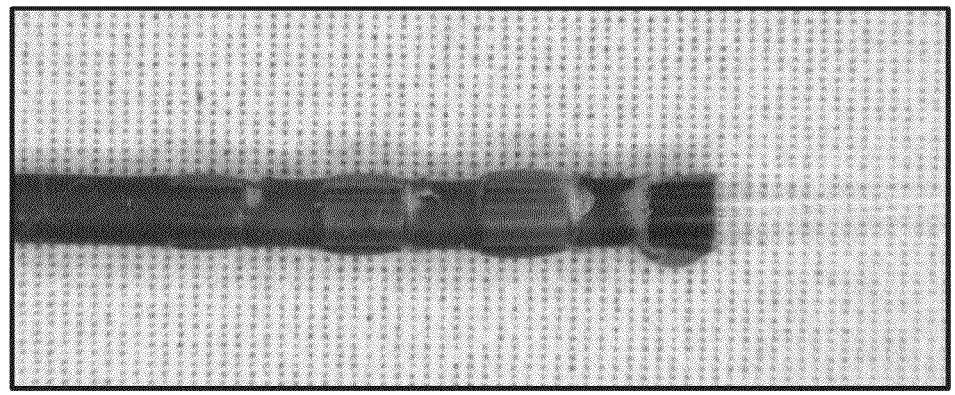
FIG. 4B is a photographic image of a fiber cable after retention by the clamping plate of FIG. 4A.

FIG. 3B illustrates the cable jacket 14 held in the groove 22b with the top plate 20a omitted. The soft cable jacket 14 has a resultant crimped or castellated surface profile, as "molded" by the castellated grooves (22a, 22b) of the plates (20a, 20b). FIG. 4A is a photographic image of a clamping plate similar to the plate 20 shown in FIG. 2. FIG. 4B is a photographic image of a fiber cable after retention by the clamping plate of FIG. 4A.

Below are relevant calculation of the dimension of the sizes of the small and large cavities, for the example of a cable jacket having 900±50 μm O.D.:

Jacket Volume:

| Jacket diameter (mm) | | Volume Per 0.875 mm Length (mm³) | Volume Per 1.750 mm Length (mm³) |
|---|---|---|---|
| Nominal | 0.900 | 0.557 | 1.113 |
| Min diameter | 0.850 | 0.497 | 0.993 |
| Max diameter | 0.950 | 0.620 | 1.240 |

Jacket Holder Cavity Volume:

| Cavity diameter (mm) | Volume Per 0.875 mm Length (mm³) |
|---|---|
| Clamp diameter 0.800 | 0.440 |
| Relief diameter 1.100 | 0.832 |
| Total volume | 1.271 |

Ratio of Jacket Volume to Cavity Volume:

| Jacket diameter (mm) | | Ratio of jacket volume to cavity volume |
|---|---|---|
| Nominal | 0.900 | 0.876 |
| Min diameter | 0.850 | 0.781 |
| Max diameter | 0.950 | 0.976 |

Squeezed Jacket Volume and Fill Percentage:

| Jacket diameter (mm) | | Relief pocket free volume (mm³) | Squeezed jacket volume (mm³) | % Fill |
|---|---|---|---|---|
| Nominal | 0.900 | 0.275 | 0.117 | 42.5 |
| Min diameter | 0.850 | 0.335 | 0.057 | 16.9 |
| Max diameter | 0.950 | 0.211 | 0.180 | 85.4 |

With the castellated grooves in the clamping plates (20a, 20b), the cable jacket 14 can be securely held by the cable holder 10 to prevent slipping of the fiber cable in the cable holder 10 from pulling in the axial direction. The walls of the small cavities (28a, 28b) hold the cable jacket 14 during pulling. The vertical walls between adjacent small and large cavities provide resistance to slippage. The extra material extending into the pockets 31 add additional pulling resistance to slippage of the fiber cable within the retention structure. The pulling resistance is expected to be increased with increase in the number of small and large cavities. The retention structure of the present invention does not require epoxy to securely position the fiber cable. Using clamping plates having open grooves, the fiber cable may be fed from any direction.

It can be appreciated that fiber cables having jackets with relatively large dimensional variations can be securely retained by the castellated retention structure in accordance with the present invention. If grooves in the cable retention structure were made without the castellated structure, large variations of cable jacket sizes would not be able to be accommodated. Specifically, if the O.D. of the groove is made large enough to accommodate cable jackets at the larger end of the O.D. tolerance range (e.g., 950 μm), the groove would not be able to clamp cable jackets at the smaller end of the O.D. tolerance range (e.g., 850 μm). Conversely, if the O.D. of the groove is made small enough to accommodate cable jackets at the smaller end of the O.D. tolerance range (e.g., 850 μm), when cable jackets are at the larger end of the O.D. tolerance range (e.g., 950 μm), excess buffer material would flash out of the grooves between the clamping plates. The retention structure of the present invention resists pulling force over a larger range of cable jacket sizes.

While the embodiment of FIG. 3 illustrates two clamping plates having similar groove structure, in another embodiment (not shown), it is within the scope and spirit of the present invention to have a first plate having a castellated groove, and a complementary second plate having a groove that has a wall that is substantially flat in the axial direction (i.e., without castellation). In addition or in the alternate, the groove in the clamping plates does not need to have a rounded bottom or semicircular sectional profile. The groove on one or both plates may have a sectional profile of other geometries, (e.g., square, rectangular, V-shaped, hexagonal, etc.) Further, the second plate may not have a groove, if a deeper U-shaped groove is provided on the first plate to accommodate the fiber cable jacket. Still further, the castellation in the groove does not need to extend over the entire groove wall. For example, for a groove having a rectangular sectional profile, castellation may be provided partially along the vertical side walls but not along the bottom of the rectangular groove in the axial direction, based on similar dimensional considerations discussed above with respect to the illustrated embodiments. The foregoing are also applicable as appropriate to the embodiments described herein below.

Figure 1:
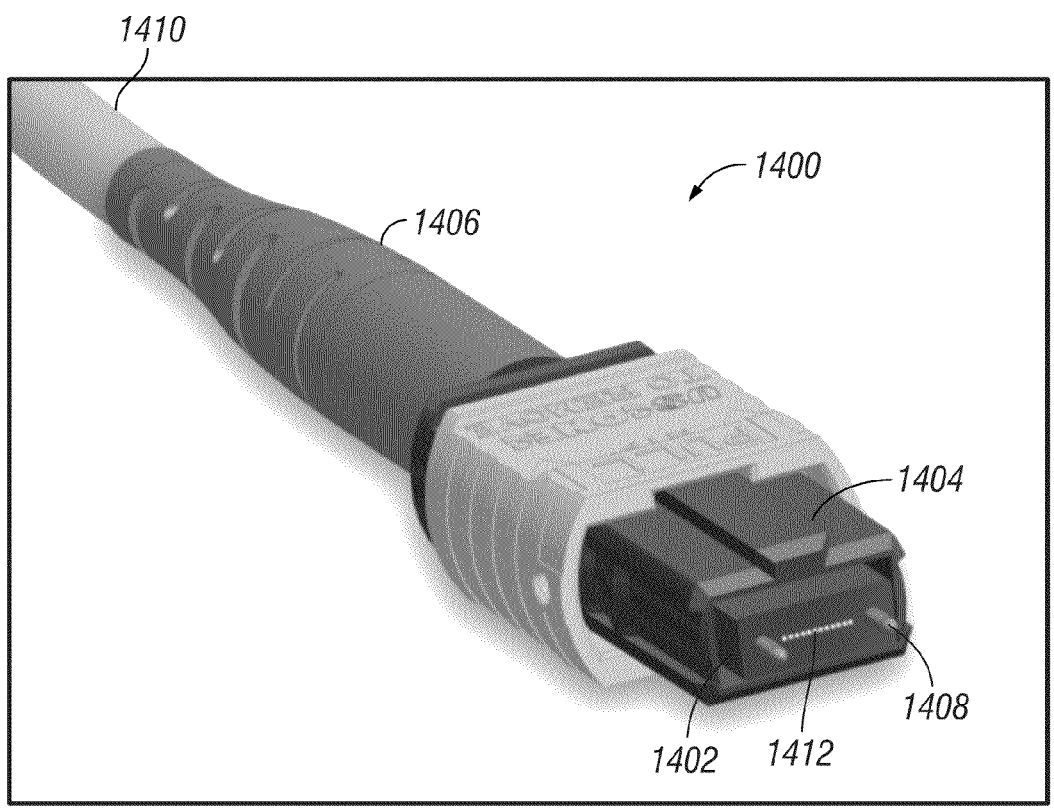
FIG. 1 illustrates a prior art multi-fiber connector.

The cable retention structure discussed above can be deployed in an optical fiber connector, similar to the connector illustrated in FIG. 1. Within the optical fiber connector, the cable retention structure is positioned relative to the ferrule that supports the optical fiber, e.g., by a housing that also holds the ferrule. The cable retention structure provides strain relief to the fiber cable.

Figure 5A:
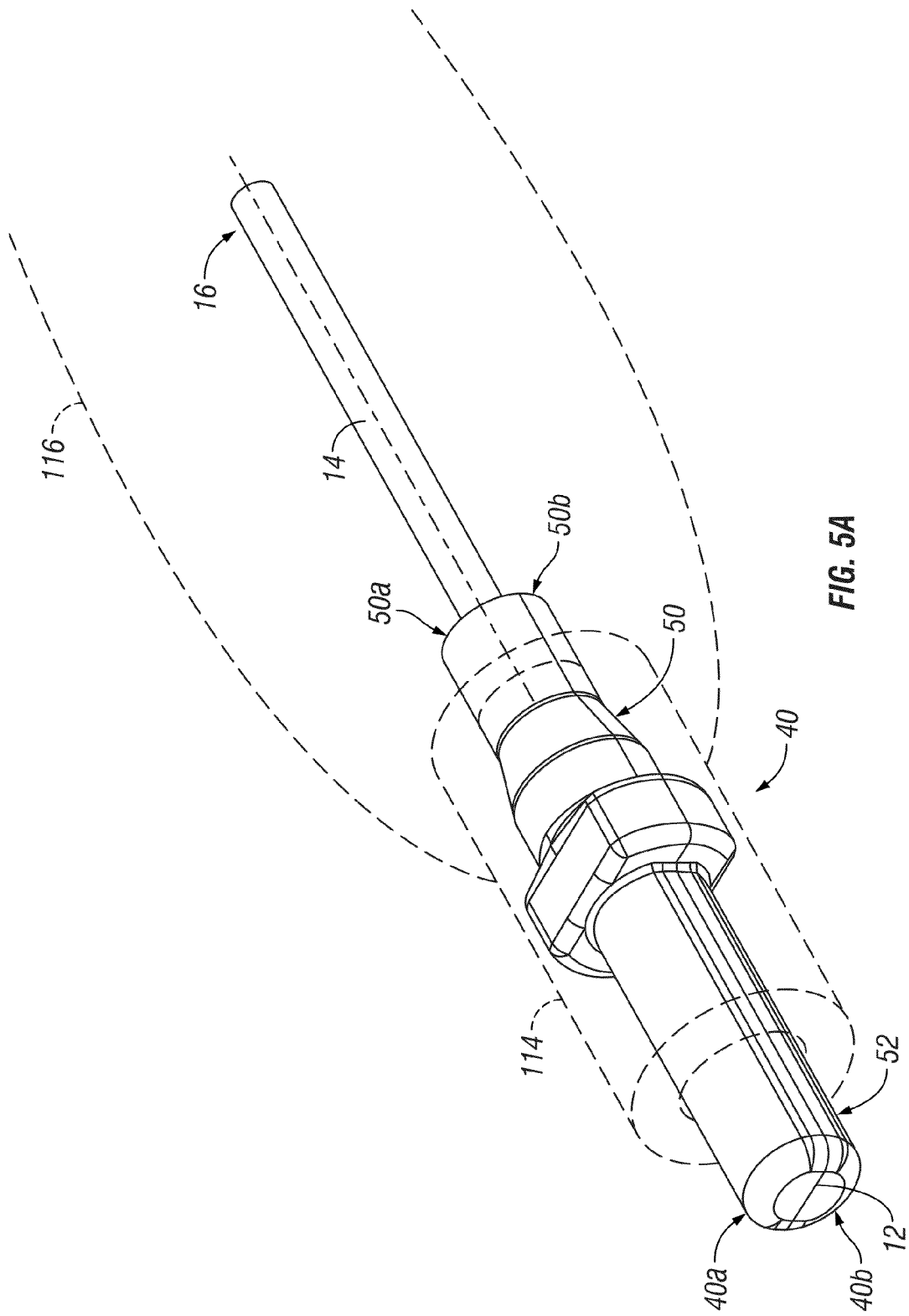
FIG. 5A is perspective view of an optical fiber connector including an integral ferrule and cable holder having a cable retention structure in accordance with one embodiment of the present invention.
Figure 5B:
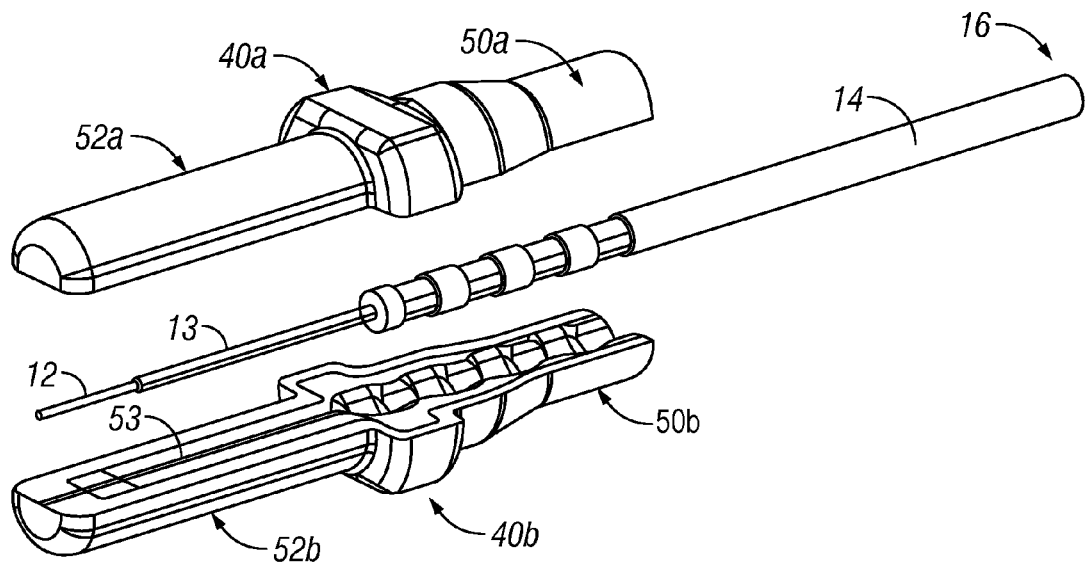
FIG. 5B is an exploded perspective view.
Figure 5C:
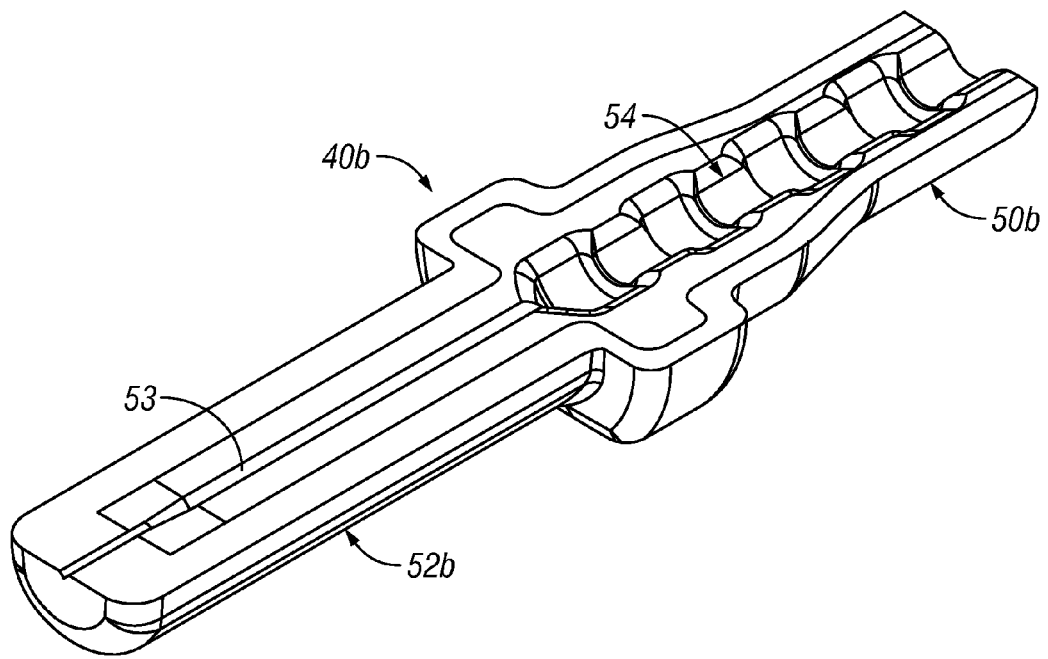
FIG. 5C is a partial perspective view of one of the halves of the clamping structure.

In one embodiment of the present invention, the cable retention structure is integral to the ferrule that holds the bare fiber end section. FIGS. 5A-5C illustrate an embodiment of an optical fiber connector including an integral ferrule holder 40.

FIG. 5A illustrates a perspective view of an optical fiber connector 100 having an assembly of components including the ferrule holder 40 in accordance with one embodiment of the present invention. The connector 100 further includes a ferrule housing 114 (schematically shown in dotted lines) and a cable boot 116 (shown in dotted lines). FIG. 5A is a simplified illustration of the optical fiber connector 100. Other than the ferrule holder 40 that is structured in accordance with the present invention, the other components of the optical fiber connector 100 may further include those found in the optical fiber assembly shown in FIG. 1 (e.g., springs, etc.). FIGS. 5B and 5C are various views of the optical fiber connector 100, with the ferrule housing 114 and cable boot 116 omitted from view (for simplicity, further embodiments are discussed herein below and illustrated with the ferrule housing 114 and cable boot omitted from view).

The ferrule holder 40 comprising a generally circular cylindrical ferrule 52 and a cable holder 50 extending from an end of the ferrule 52. In this embodiment, the ferrule holder 40 comprises two substantially identical ferrule holder halves 40a and 40b, as more clearly shown in FIG. 5B. FIG. 5C illustrates in greater detail the open structure of the interior of the ferrule holder halve 40b. Similar structures are found in the ferrule holder halve 40a (not shown). The ferrule holder halve 40b is a one-piece structure including a ferrule halve 52b and cable holder halve 50b. The cable holder halve 50b includes an open cable retention structure 54 (namely a castellated groove) similar to the open groove structure of the plate 20 shown in FIG. 2, which will not be repeated herein. The ferrule halve 52b has a small open groove 53 shaped and sized to receive a section (e.g., half circular cylinder) of the bare optical fiber 12 and a thin slip layer 13 without the exterior protective cable jacket 14.

The opposing ferrule holder halves (40a, 40b) are mated together to complete the ferrule holder 40, with the ferrule halves (52a, 52b) clamping the optical fiber 12 (including slip layer 13) and the cable holder halves (50a, 50b) clamping the cable jacket 14. The ferrule holder halves (40a, 40b) may be maintained together by laser welding, or held together by external biasing (e.g., by housing 114).

Figure 6A:
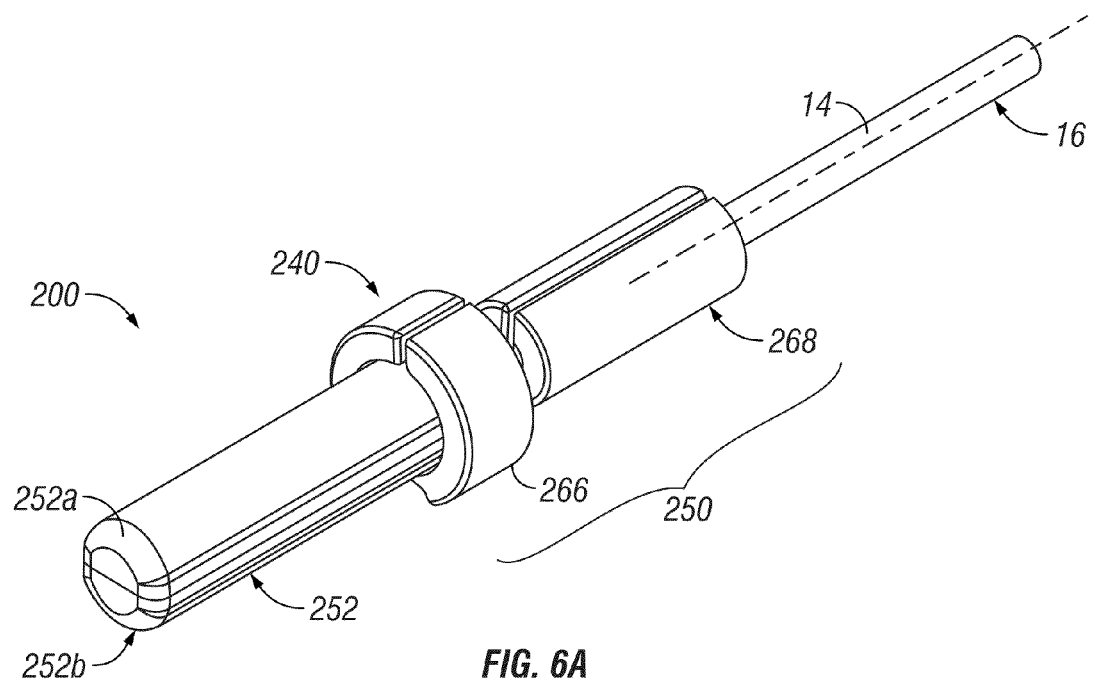
FIG. 6A is a perspective view of an optical fiber connector including a ferrule and a cable holder attached to the ferrule in accordance with one embodiment of the present invention.

In another embodiment, the ferrule holder includes a ferrule and a separate cable holder having the cable retention structure attached to the fiber ferrule. FIG. 6A illustrates a perspective view of an optical fiber connector 200 having an assembly of components including the ferrule holder 240 in accordance with one embodiment of the present invention. FIG. 6A is a simplified illustration of the optical fiber connector 200. Other than the ferrule holder 240 that is structured in accordance with the present invention, the other components of the optical fiber connector 200 are omitted from view, which may further include those found in the optical fiber assembly shown in FIG. 1 (e.g., housing, cable boot, springs, etc.).

The ferrule holder 240 includes a ferrule 252 and a separate cable holder 250 attached to the ferrule 252. In this embodiment, the ferrule 252 has a generally circular cylindrical body that comprises two substantially identical ferrule halves 252a and 252b, as more clearly shown in FIG. 6D. The ferrule halve 252b has a small open groove 253 shaped and sized to receive a section (e.g., half circular cylinder) of the bare optical fiber 12 and a thin slip layer 13 without the exterior protective cable jacket 14.

Figure 6B:
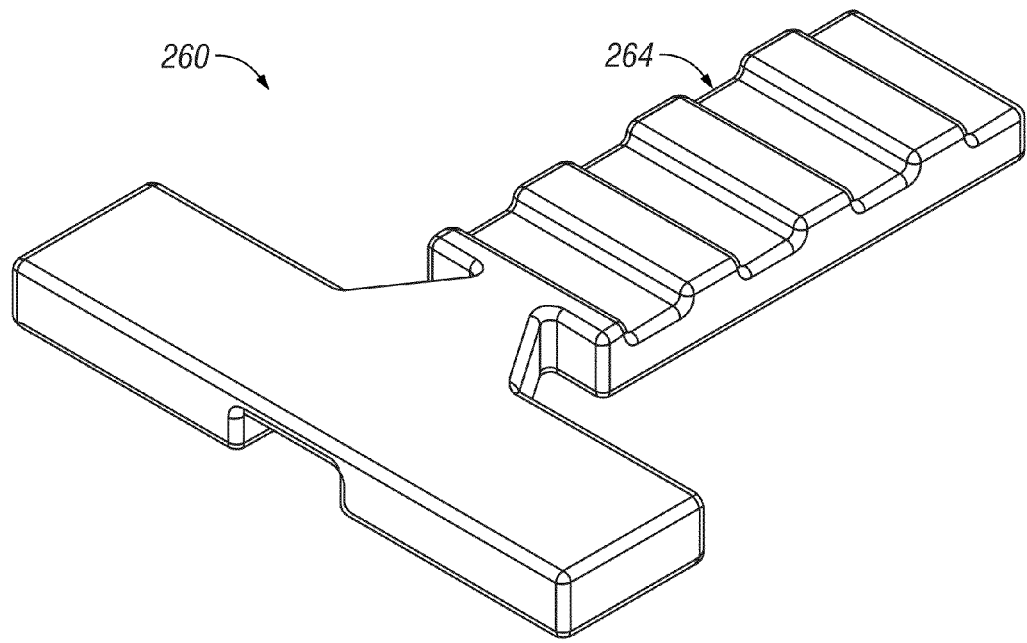
FIGS. 6B-6E illustrate the formation of the cable holder and assembly to the ferrule.
Figure 6C:
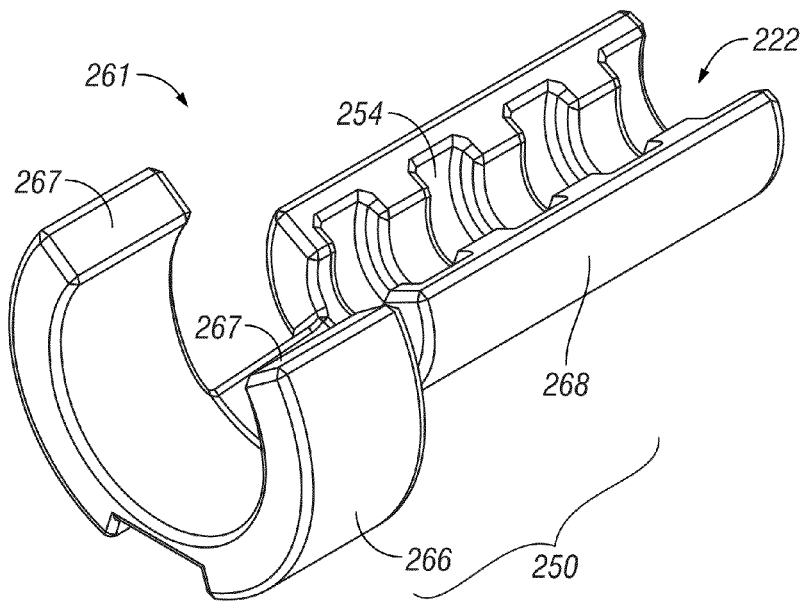

FIG. 6C illustrates in greater detail the open structure of the interior of the cable holder 250. The cable holder 250 includes an open, castellated structure 254 (a series of large and small cavities along the axial direction) for retaining cable jacket 14. The castellated structure 254 is similar to the castellated structure in the open groove of the plate 20 shown in FIG. 2, which will not be repeated herein. Comparing to the embodiment of FIG. 5, the cable holder 250 of embodiment of FIG. 6 is not integral to the ferrule 252. The cable holder 250 includes a collar 266 extending at one end of a stem 268. The cable holder 250 is attached to the ferrule 252 via the collar 266 and the stem 268 wraps around the fiber cable jacket 14. FIGS. 6B-6E illustrate the formation of the cable holder and assembly to the ferrule.

Figure 6D:
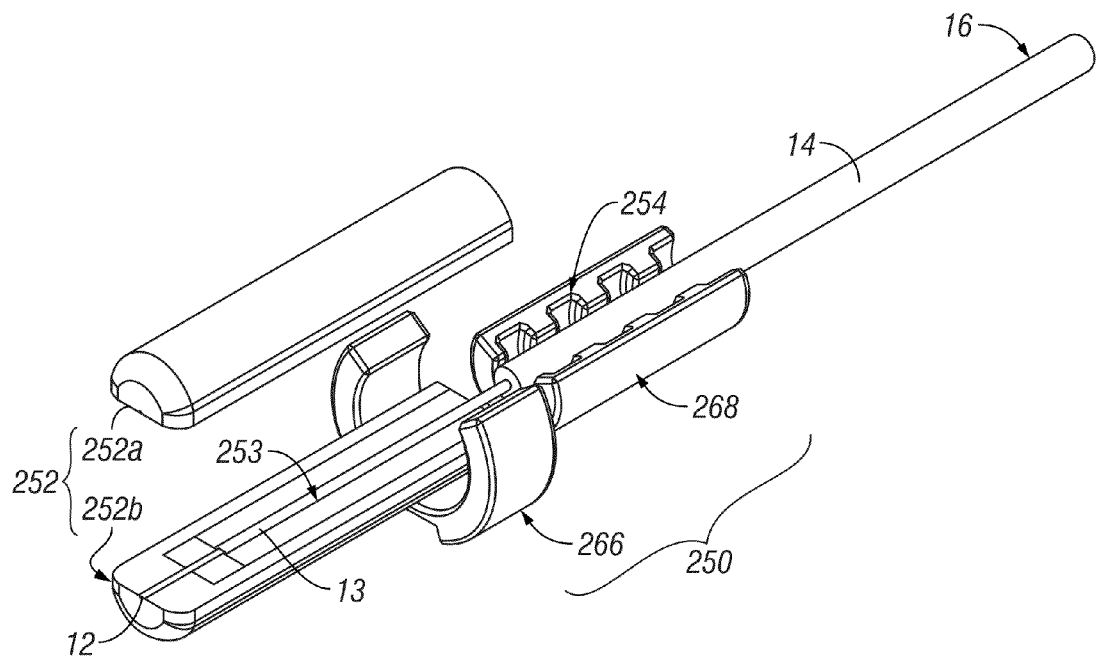
Figure 6E:
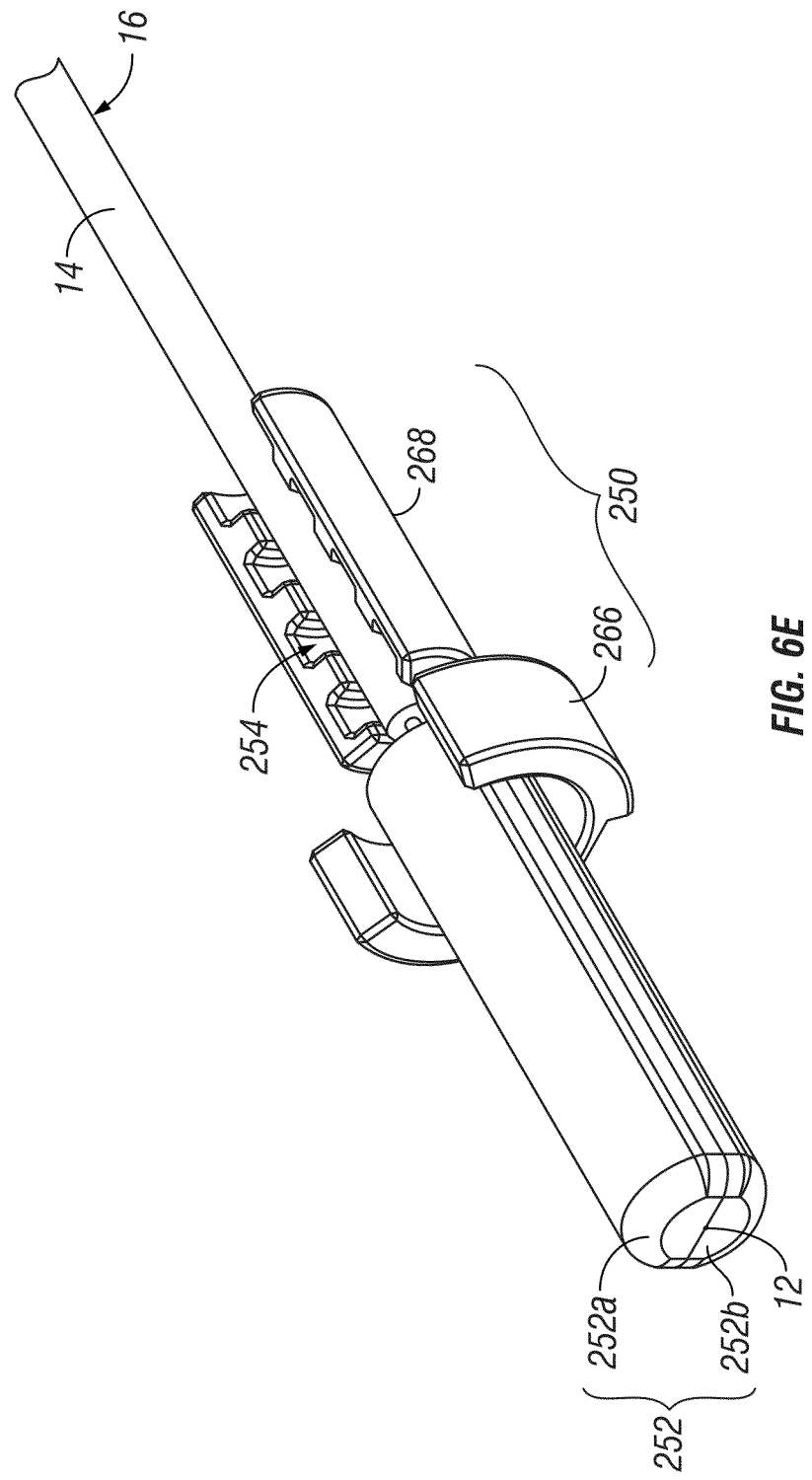

In FIG. 6B, starting from a flat piece of stock, a T-shaped plate 260 is formed (e.g., by stamping) having a corrugate surface feature 264 as shown. In FIG. 6C, the T-shaped plate 260 is bent or rolled into a preform 261 comprising an open collar 266 having extended prongs 267, and a generally cylindrical stem 268 defining an open groove 222 having similar castellated walls as in the embodiments of FIG. 2 and FIG. 5. In FIG. 6D, the ferrules halves (252a, 252b) are inserted within the open collar 266 and the optical fiber cable is inserted into the open groove 222 of the preform 261 (see also FIG. 6E). The extended prongs 267 of the collar 266 is further bent or rolled to wrap around and clamp the opposing ferrule halves (252a, 252b) to maintain them in a mated structure to complete the ferrule 252. In addition, the stem 268 is further rolled to wrap around and clamp onto the cable jacket 14. The resultant structure is shown in FIG. 6A. In this position, the castellated groove of the stem "bite" into the cable jacket 14, to provide cable retention similar to the earlier described embodiments. In this position, the collar 266 and the stem 268 in the cable holder 250 need not completely wrap around the ferrule 252 and the cable jacket 14, respectively.

The ferrule holder 250 of FIG. 6 is easy to manufacture (e.g., by initially stamping the T-shaped plate), and provides a convenient structure that securely holds the ferrule halves (252a, 252b) in a mated relationship and securely retain the cable jacket 14. The ferrule halves (252a, 252b) need not be maintained together by more complex procedures, e.g., by laser welding. Accordingly, the ferrule holder 250 is easy to deploy in the field, as the preform 261 in FIG. 6C can be easily bent by applying an appropriate tool in the field to complete the ferrule holder 250.

Figure 7:
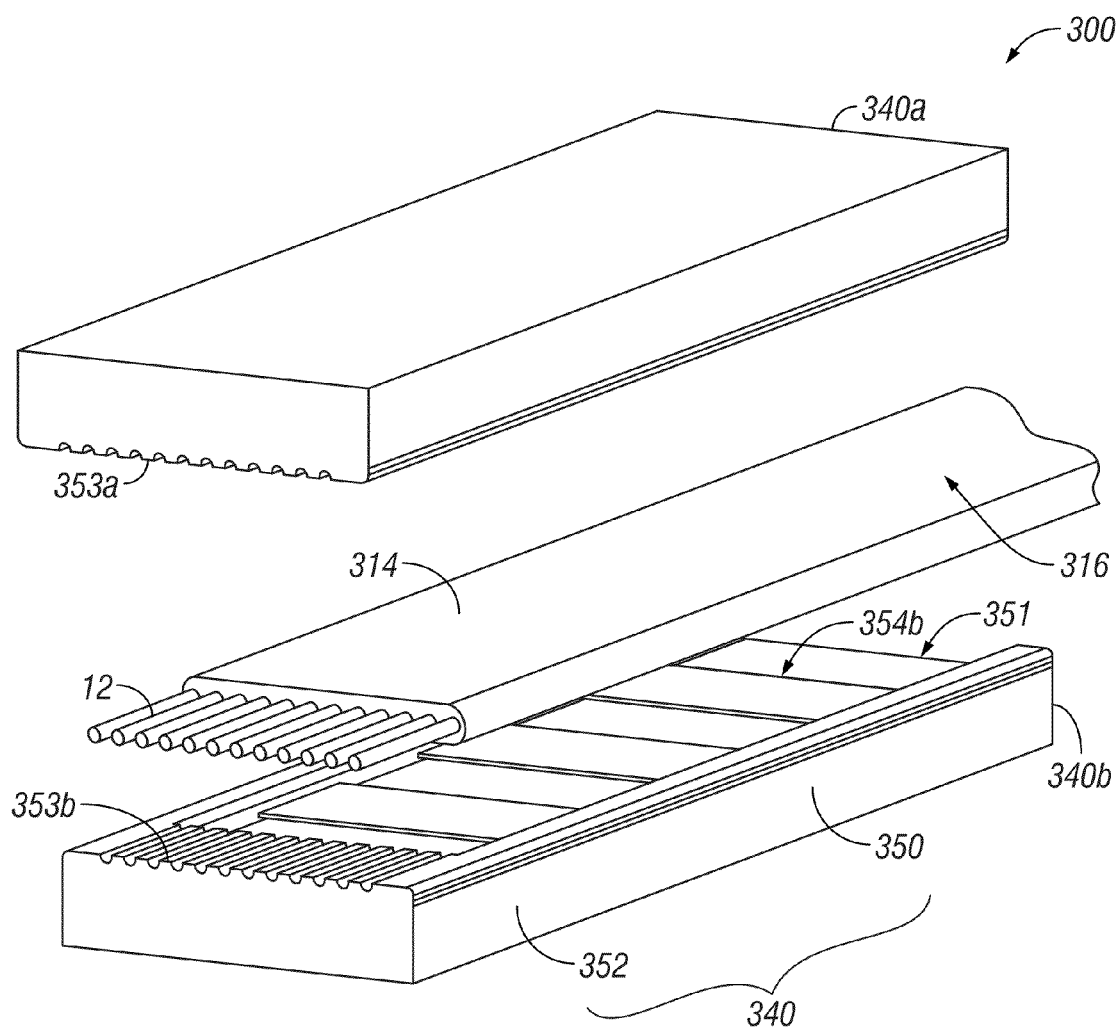
FIG. 7 is an exploded view of an optical fiber connector including an integral ferrule and cable holder having a cable retention structure for multi-fiber cable in accordance with one embodiment of the present invention.

The foregoing embodiments are described in reference to retain a single-fiber cable in an optical fiber connector. The inventive concept can be extended to retain multi-fiber cables. FIG. 7 is an exploded view of an optical fiber connector 300 including an integral ferrule holder 340 having a cable retention structure for multi-fiber cable in accordance with one embodiment of the present invention. FIG. 7 is a simplified illustration of the optical fiber connector 300. Other than the ferrule holder 340 that is structured in accordance with the present invention, the other components of the optical fiber connector 300 are omitted from view, which may further include those found in the optical fiber assembly shown in FIG. 1 (e.g., housing, cable boot, springs, alignment pins, etc.). The cable holder including cable retention structure of this embodiment is designed for securely retaining a ribbon fiber cable 316 that includes a parallel array of optical fibers 12 covered by an exterior protective cable jacket 314 in the shape of a ribbon.

The ferrule holder 340 comprising a generally rectangular ferrule 352 and a cable holder 350 integrally extending from an end of the ferrule 352. In this embodiment, the ferrule holder 340 comprises two substantially identical ferrule holder halves 340a and 340b. Similar structures are found in the ferrule holder halve 340a (not shown). The ferrule holder halve 340b is a one-piece structure, including a ferrule halve 352b and cable holder halve 350b. The cable holder halve 350b includes an open cable retention structure 354b (namely a castellated groove 351) similar to the castellated structure of the open groove of the plate 20 shown in FIG. 2, except that the groove 351 in this case is a rectangular bottom groove instead of a rounded bottom groove in FIG. 2. The rectangular bottom groove 351 is wide enough to accommodate the ribbon-shaped cable jacket 314. Other design considerations for the cable holder including the cable retention structure discussed above in connection with the earlier embodiments are also applicable to this embodiment. The ferrule halve 352b has a plurality of small open grooves 353b shaped and sized to the bare optical fibers 12 (and their thin slip layer, not shown) without the exterior protective cable jacket 314.

The opposing ferrule holder halves (340a, 340b) are mated together to complete the ferrule holder 340, with the ferrule halves (352a, 352b) clamping the optical fibers 12 (including slip layer 13) and the cable holder halves (350a, 350b) clamping the cable jacket 314. The ferrule holder halves (340a, 340b) may be maintained together by laser welding, or held together by external biasing (e.g., by a housing of the optical fiber connector).

Figure 8:
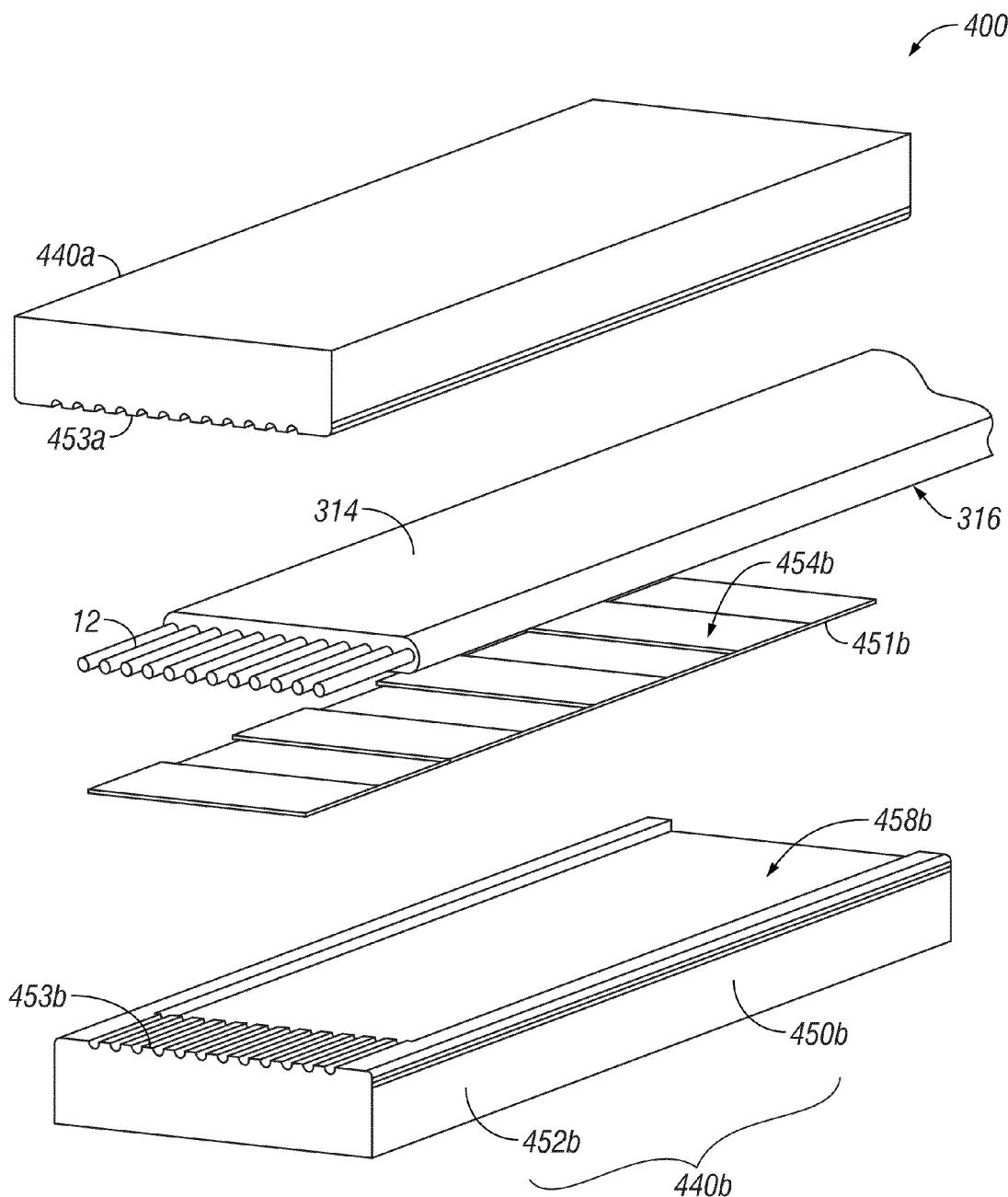
FIG. 8 is an exploded view of an optical fiber connector including a ferrule and a cable holder insert having a cable retention structure for multi-fiber cable in accordance with one embodiment of the present invention.

The castellated structure 354 of the rectangular bottom groove in FIG. 7 may be provided as a separate cable holder insert of the ferrule holder. FIG. 8 is an exploded view of an optical fiber connector 400 including a ferrule 440 and a cable holder insert 451 having a cable retention structure 454 for multi-fiber cable in accordance with one embodiment of the present invention. This embodiment is similar to the embodiment of FIG. 7 in many respects, except that the castellated structure 454 is provided on the insert 451 that is supported in an extended cable holder section 450 of the ferrule 440.

FIG. 8 is a simplified illustration of the optical fiber connector 400. Other than the ferrule 440 that is structured in accordance with the present invention, the other components of the optical fiber connector 400 are omitted from view, which may further include those found in the optical fiber assembly shown in FIG. 1 (e.g., housing, cable boot, springs, alignment pins, etc.). The cable holder including cable retention structure of this embodiment is designed for securely retaining a ribbon fiber cable 316 that includes a parallel array of optical fibers 12 covered by an exterior protective cable jacket 314 in the shape of a ribbon.

The ferrule 440 comprising a generally rectangular cylindrical body having fiber holder section 452 and a cable holder section 350 integrally extending from an end of the fiber holder section 452. In this embodiment, the ferrule 440 comprises two substantially identical ferrule halves 440a and 440b. The ferrule halve 440b is a one-piece structure, including a fiber holder section 452b and cable holder section 450b. The cable holder section 450b includes an open rectangular cavity 458b that receives the insert 451b. The insert 451b is a plate having an open castellated cable retention structure 454b similar to the castellated structure of the open groove 22 of the plate 20 shown in FIG. 2, and of the rectangular bottom groove 351 in FIG. 7. The ferrule halve 440a has similar structures, including a insert 451a (not shown).

The rectangular cavity 458b is dimensioned to be wide and deep enough to accommodate the ribbon-shaped cable jacket 314 and the insert 451b. With the insert 451b received in the cavity 458b, the overall structure resembles the structure of the castellated rectangular bottom groove 351 in FIG. 7. Other design considerations for the cable holder including the cable retention structure discussed above in connection with the earlier embodiments are also applicable to this embodiment. The ferrule holder section 452b has a plurality of small open grooves 453b shaped and sized to the bare optical fibers 12 (and their thin slip layer, not shown) without the exterior protective cable jacket 314.

The opposing ferrule halves (440a, 440b) are mated together to complete the ferrule 440, with the ferrule holder sections (452a, 452b) clamping the optical fibers 12 (including slip layer 13) and the cable holder sections (450a, 450b) clamping the inserts 451 to clamp the cable jacket 314. The ferrule halves (440a, 440b) may be maintained together by laser welding, or held together by external biasing (e.g., by a housing of the optical fiber connector, not shown).

While some of the foregoing embodiments illustrates castellations provided on opposing clamping cable holder halves or ferrules halves having similar structures, it is within the scope and spirit of the present invention to have a cable holder halve or ferrule halve having castellations, and a complementary opposing cable holder halve or ferrule have having a different structures (e.g., without groove and/or castellations). For example, in the embodiment of FIG. 8, only one insert 451b may be deployed at the cable holder section 450b of the bottom ferrule halve 440b, which insert 451b clamps the fiber cable jacket 314 against a flat surface (bottom) of the cavity 458a at the cable holder section 450a of the upper ferrule halve 440a. Similarly in the embodiment of FIG. 7, the top cable holder section 350a opposing the castellated structure 354b may not be provided with castellations.

The above disclosed castellated inserts may be adapted to be deployed in the optical fiber connectors disclosed in U.S. patent application Ser. No. 13/650,099 and U.S. patent application Ser. No. 13/650,119, where were commonly assigned to the assignee of the present invention. These applications are incorporated by reference as if fully set forth herein.

In another aspect of the present invention, the above disclosed open structure of the ferrules and of the cable holders and ferrule holders having cable retention structure (i.e., in halve structures and/or plate structures) lends itself to mass production processes such as stamping and extrusion, which are low cost, high throughput processes. A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the ferrules of the present invention.

In one embodiment, the structures of the above disclosed ferrules, ferrule holders and cable holders may be made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Alternatively, the structures may be made of a plastic or polymeric material.

The cable retention structure in accordance with the present invention overcomes many of the deficiencies of the prior art, resulting in an optical fiber connector that accommodates large variations in the relatively soft exterior layer(s) of an optical fiber cable, which provides ease of use and high reliability with low environmental sensitivity, and which can be fabricated at low cost.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An optical fiber cable retention structure, comprising a first body comprising a castellated structure for engaging a cable jacket, wherein a sectional profile of the castellated structure comprises alternating valleys and peaks, and wherein the peaks have a substantially flat top surface; and
    a second body opposing the first body,
        wherein when the cable jacket is clamped between the castellated structure of the first body and the second body with opposing surfaces of the first body and second body in mating contact, the peaks of the castellated structure of the first body press on the cable jacket and the valleys of the castellated structure of the first body receive excess material of the cable jacket that flows to the valleys under pressure of the peaks, thereby forming a castellated surface profile corresponding to the castellated structure of the first body, and interlocking the castellated surface profile of the cable jacket to the castellated structure of the first body.

2. The optical fiber cable retention structure as in claim 1, wherein the first body further comprises an open groove defined in the first body for receiving the cable jacket, and wherein the castellated structure is provided in the groove, at a surface for engaging the cable jacket.

3. An optical fiber cable retention structure, comprising a first body comprising a castellated structure for engaging a cable jacket, wherein the first body further comprises an open groove defined in the first body for receiving the cable jacket, and wherein the castellated structure is provided in the groove, at a surface for engaging the cable jacket, and wherein the castellated structure defines alternating large and small cavities along an axial direction of the groove; and
    a second body opposing the groove of the first body,
        wherein when the cable jacket is clamped between the castellated structure of the first body and the second body with opposing surfaces of the first body and second body outside of the groove in mating contact, the small cavities of the castellated structure of the first body press on the cable jacket and the large cavities of castellated structure of the first body receive excess material of the cable jacket that flows to the larger cavities under pressure of the small cavities, thereby forming a castellated surface profile corresponding to the castellated structure of the first body, and interlocking the castellated surface profile of the cable jacket with the castellated structure of the first body.

4. The optical fiber cable retention structure as in claim 3, wherein the castellated surface profile of the cable jacket conforms to the castellated structure of the first body.

5. An optical fiber cable retention structure, comprising:
a first body comprising a castellated structure for engaging a cable jacket, wherein the first body further comprises an open groove defined in the first body for receiving the cable jacket, and wherein the castellated structure is provided in the groove, at a surface for engaging the cable jacket, and wherein the castellated structure defines alternating large and small cavities along an axial direction of the groove;
a second body opposing the groove of the first body,
wherein the cable jacket is clamped between the castellated structure and the second body, with opposing surfaces of the first body and second body outside of the groove in mating contact, wherein surface of the cable jacket conforms to the castellated structure, and wherein the first body further comprises a relief provided at the edge of the groove, which receives excess material of the cable jacket as its surface conforms to the castellated structure when it is clamped between the first and second bodies with the opposing surfaces of the first body and second body in mating contact.

6. The optical fiber cable retention structure as in claim 1, further comprising a ferrule for holding an optical fiber, wherein the ferrule extends from the first body.

7. The optical fiber cable retention structure as in claim 6, wherein the ferrule and the first body are an integral structure.

8. The optical fiber cable retention structure as in claim 6, wherein the ferrule and the first body are separate structures coupled by attachment.

9. The optical fiber cable retention structure as in claim 8, wherein the first body further comprises a collar clamping onto the ferrule.

10. The optical fiber cable retention structure as in claim 9, wherein the first body comprises a stem in which an open groove is defined with the castellated structure.

11. The optical fiber cable retention structure as in claim 1, wherein the cable jacket is in the form of a ribbon, protecting multiple optical fibers, wherein the castellated structure is provided in a wide groove provided in the first body to accommodate the ribbon.

12. The optical fiber cable retention structure as in claim 11, wherein the castellated structure is provided on a separate insert that is received in a wide groove in the first body.

13. The optical fiber cable retention structure as in claim 2, wherein at least the peaks of the castellated structure each defines a curved surface in axial cross-section.

14. The optical fiber cable retention structure as in claim 13, wherein the curved surface is generally cylindrical.

15. The optical fiber cable retention structure as in claim 14, wherein the castellated structure defines alternating large and small generally cylindrical cavities along an axial direction of the groove.

16. The optical fiber cable retention structure as in claim 14, wherein the valleys of the castellated structure each defines a generally cylindrical surface in axial cross-section.

17. The optical fiber cable retention structure as in claim 1, wherein the castellated surface profile of the cable jacket conforms to the castellated structure of the first body.

18. The optical fiber cable retention structure as in claim 17, wherein the second body comprises a similar castellated structure as the castellated structure of the first body, wherein the castellated structures of the first and second bodies define alternating large and small generally cylindrical cavities along an axial direction of the groove.

19. The optical fiber cable retention structure as in claim 1, wherein the first body further comprises an open groove defined by the castellated structure in the first body for receiving the cable jacket, at a surface for engaging the cable jacket, wherein the castellated structure defines alternating large and small cavities along an axial direction of the groove, wherein surface of the cable jacket conforms to the castellated structure.

20. The optical fiber cable retention structure as in claim 19, wherein the second body comprises a similar castellated structure as the castellated structure of the first body, and wherein the castellated structures of the first and second bodies define alternating large and small generally cylindrical cavities along an axial direction of the groove.

* * * * *